United States Patent
Beukers et al.

[15] 3,671,968
[45] June 20, 1972

[54] TWO CHANNEL DIRECTION FINDER

[72] Inventors: John M. Beukers; Christian B. Williams, both of Stony Brook, N.Y.

[73] Assignee: The United States of America as represented by the Secretary of the Army

[22] Filed: Jan. 26, 1970

[21] Appl. No.: 5,455

[52] U.S. Cl. ..................................................343/113 DE
[51] Int. Cl. ..............................................................G01s 3/54
[58] Field of Search.............................................343/113 DE

[56] References Cited
UNITED STATES PATENTS 3,329,955   7/1967   Beukers et al..................343/113 DE Primary Examiner—Benjamin A. Borchelt
Assistant Examiner—R. Kinberg
Attorney—Harry M. Saragovitz, Edward J. Kelly, Herbert Berl and Daniel D. Sharp

[57] ABSTRACT

A direction finder including two receiving channels commutatively connected to different closely spaced antennas of a receiving antenna array such that the phase difference between the two receiving antennas is always kept below a half wavelength at the highest operating frequency.

2 Claims, 1 Drawing Figure

TWO CHANNEL DIRECTION FINDER

BACKGROUND OF THE INVENTION

Dual-channel direction finders are known which include a phase detector for comparing the relative phase of the phase modulation information related to the azimuth direction of arrival of incoming energy at a circular array of antennas. If one simulates the physical rotation of the antenna through a radiation field by commutating the outputs of a number of fixed antennas spaced equally about a circumference equal to that normally traced out by the rotating antenna, the signal received by the antenna array will experience a sinusoidal phase modulation in accordance with the Doppler principle. The frequency of this modulation is that of the rotating commutator and the phase of the modulation is related uniquely to the direction of arrival of the radiation field. As the circular array of antennas is commutated, the radiant energy derived from each antenna, after passing through a separate receiving system, is applied to a phase detector for comparing the phase between antennas in a cyclical manner as the commutator scans the array. Under these conditions, a conventional phase detector is useful so long as the phase difference between antennas being scanned by the dual commutator does not exceed 180 degrees at the highest operating frequency. If the phase difference should exceed a half wavelength, ambiguities exist in the phase detector and the system no longer functions as an accurate direction finder.

In order to avoid these discontinuities in the phase detector characteristic, the inputs to the two commutators are derived from separate receiving antennas in the array which are always separated by an angle such that the phase difference between the phase modulation produced by the separate antennas is less than a half wavelength at the highest frequency of radiation to be received. The outputs of the two commutators are applied to separate receiving channels and, by way of limiters (for elimination of amplitude variations), to the phase detector. By using this approach, the maximum phase step presented to the phase detector is that occurring between antennas separated by less than 180 degrees and, therefore, is less than a half wavelength. The phase detected output can be applied to a conventional direction finder display, such as a cathode ray tube having associated therewith a goniometer type sweep circuit.

SUMMARY OF THE INVENTION

In the dual channel quasi-Doppler direction finding system of the invention, dual commutation of a fixed antenna array imposes a space or phase modulation upon received electromagnetic radiation and the relative phase of this phase modulation contains information relative to the azimuth direction of arrival of the received radiation. Dual commutator means serve to connect two separate antennas of the receiving antenna array to corresponding distinct receiver channels, each of which include limiters for removing the effect of amplitude variations on the signals picked off by the separate antennas. The two phase-modulated signals from the dual receiving channel are applied to a phase detector from which a signal is derived whose amplitude depends upon the relative phase of the phase modulation of the two signals passing through the corresponding receiving channels. The detector signal is supplied to a conventional indicator means which also is provided with appropriate sweep voltages synchronized with the commutation.

In order to avoid ambiguities in the phase detector, the two commutator inputs are derived from antennas of the receiving antenna array in which the phase difference of the modulation is maintained below 180 degrees, and preferably below about 140 degrees, to allow for instrumental phasing errors and multi-path and site errors. By connecting the two commutators to adjacent antennas in the array, the desired limitation on the phase difference is attained with antennas angularly separated so that the distance between adjacent antennas along the locus of the array is less than a half wavelength at the highest frequency of operation of the system. Although it is not essential that the commutators be connected to adjacent antennas, so long as the phase difference is less than a half wavelength, this connection to adjacent antennas either allows for the least phase difference for a given array, or allows one to increase the diameter of the antenna array without exceeding the half wave spacing between commutator pick off points along the antenna array.

DETAILED DESCRIPTION OF THE INVENTION

Figure 1:
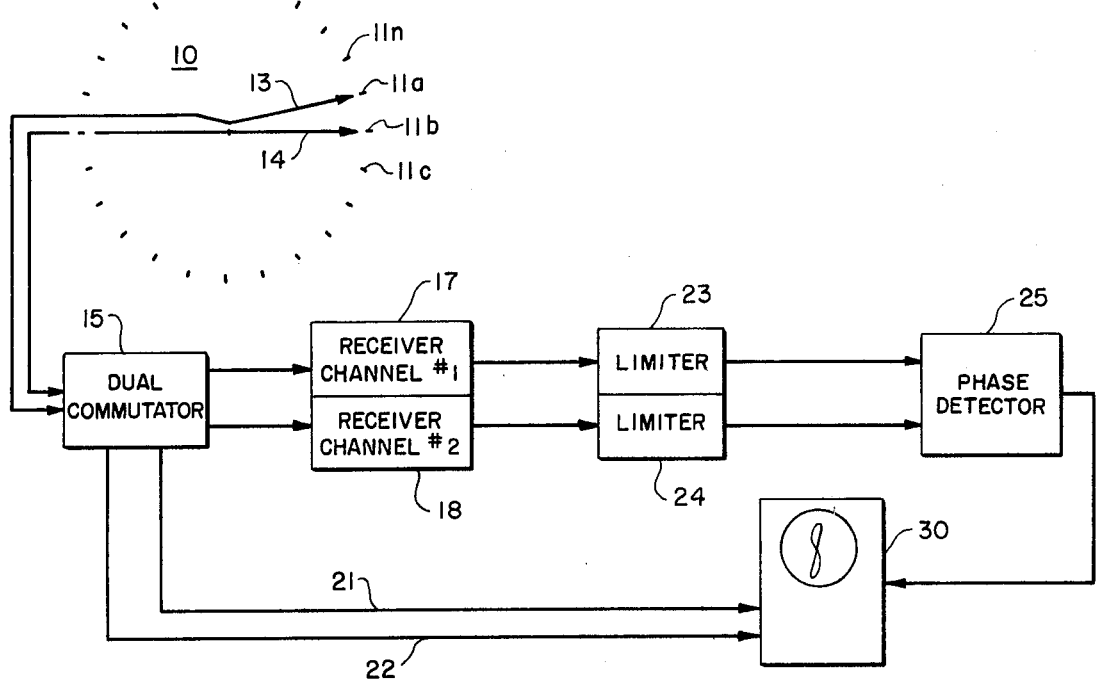
FIG. 1 is a block diagram of a direction finder system in accordance with the invention.

The direction finder of FIG. 1 includes an array 10 of fixed vertical monopulse antennas 11a, 11b ... 11n which are sensitive to vertical polarization and which, together with the necessary electrical terminations and cables, are made substantially identical so that the phasing from each antenna to the receiving channels is substantially the same. As shown in FIG. 1, the spacing of adjacent antennas is made less than 180 electrical degrees at the highest operating frequency to avoid phase ambiguities during scanning of the array 10 by the pickoff elements 13 and 14 of the dual commutator 15 which are shown momentarily connected to adjacent antennas 11a and 11b.

Instead of rotating the array 10 physically, the antenna array 10 of the present quasi-Doppler direction finder is fixed and the effect of antenna rotation is achieved by scanning the fixed antenna array 10 by the dual commutator pickoff elements 13 and 14. The dual commutator 15 may be any type which allows for sequential connection of the antennas to the corresponding dual receiving channels 17 and 18. If the phase difference between two antennas which are not adjacent is less than 180°, then the commutator pickoff elements 13 and 14 can be connected to said two non-adjacent antennas. During the scanning of the antenna array, the angular relationship between the two pickoff elements is maintained; that is, the two antennas being sampled at any given instant are always adjacent antennas, or antennas spaced by a given amount less than 180°, as the case may be. The commutators may be of the mechanical type in which the elements 13 and 14 are each rotatably driven by a prime mover; alternatively, electrical means may be used to provide the commutation. The dual commutator also provides means for producing two alternating current reference signals which are 90° out of phase; these reference signals are supplied by way of lines 21 and 22 to the indicator 30 and provide the sweep voltage for the indicator. The indicator sweep thus is synchronized with the scanning of the antenna array 10.

The phase modulated RF signals picked off by the elements 13 and 14 of the dual commutator 15 are supplied to the respective first and second receiver channels, indicated in the drawing as 17 and 18, respectively. These receiver channels preferably have a common local oscillator to preserve phase correspondence of the two receiving channels and comprise the usual RF amplifiers, mixer and intermediate frequency amplifier stages. The two receiving channels 17 and 18 should be designed, if possible, so that there is no appreciable differential phase shift in the two receiving channels, whereby the only substantial phase shift in the two receiving channels, whereby the only substantial phase shift in the two receiving channels is that owing to the phase shift between the phase modulation on the antennas being sampled by the commutator means. The bandwidth necessary for the receiving channels depends, in part, upon the scan rate, since the frequency separation of the sideband is directly related to this scan rate.

The processed phase-modulated RF signals from the receiver channels 17 and 18 are amplitude-limited by respective limiters 23 and 24 to remove amplitude variations from the signal. The limited phase modulated signals then are applied to the phase detector 25 which provides an output the amplitude of which is dependent upon the phase difference between the signals received by the pair of antennas being commutated at any given instant. The output of the phase detector 25 is applied to indicator 30 and, when combined with the circular sweep voltages from the commutator 15, provide a propellor-shaped visual display; the axis of the propeller-shaped display defines the bearing of the energy source received by the antenna array 10. If the direction of the incoming signal arriving at the receiving antenna array changes, the relative phase of the signals from the two receiver channels 17 and 18 changes, the output of the phase detector 25 also changes and the position of the propeller-shaped display changes correspondingly to indicate the azimuth of the source of the incoming signal.

What is claimed is:

1. A direction finder for indicating the direction of a source of radiant energy comprising an array of antennas receptive of said radiant energy, a pair of commutating means for scanning said array and phase modulating the energy received by said array, a pair of receiving channels each connected to a separate one of said commutating means, a phase detector coupled to both of said receiving channels for providing an output signal the amplitude of which is dependent upon the phase difference between the signals received by the pair of antennas being commutated at any given instance, each of said commutating means having scanning elements connected to separate antennas in which the phase difference therebetween is less than a half wavelength at the highest frequency of said received radiant energy, and indicating means including deflection means synchronized with said scanning and responding to the output of said phase detector for providing a direction-indicating display.

2. A direction finder as recited in claim 1 wherein said antennas to which said scanning elements are connected are adjacent antennas of said array.

* * * * *